Feb. 4, 1930.  H. E. S. CHAYES  1,745,602
DENTAL TOOL
Original Filed Aug. 26, 1921
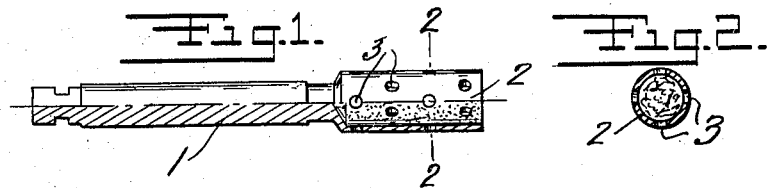
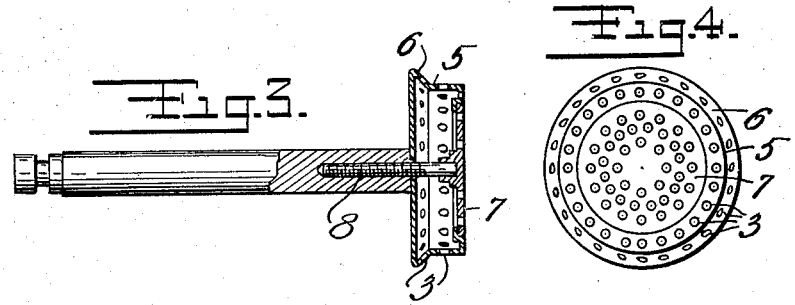
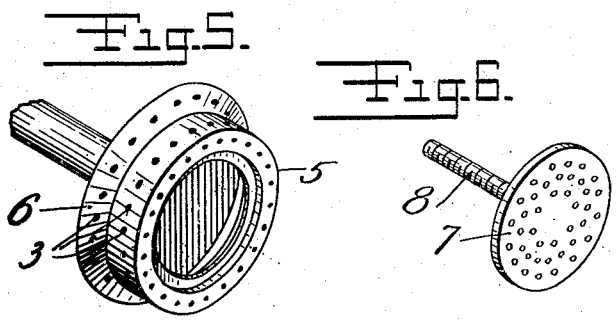
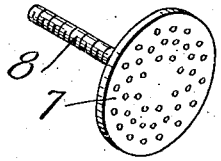

Patented Feb. 4, 1930

1,745,602

UNITED STATES PATENT OFFICE

HERMAN E. S. CHAYES, OF NEW YORK, N. Y., ASSIGNOR, BY MESNE ASSIGNMENTS, TO CHAYES DENTAL INSTRUMENT CORPORATION, OF NEW YORK, N. Y., A CORPORATION OF DELAWARE

DENTAL TOOL

Application filed August 26, 1921, Serial No. 495,612. Renewed February 6, 1926.

This invention relates generally to dental tools of the type employed in preparing a dental cavity to receive a protective filling, or in cutting or grinding the tooth structure for any purpose.

In dental work which includes the cutting or grinding of the tooth structure, it has heretofore been the practice to make use of steel burrs or drills whose operation is attended with very considerable pain and discomfort to the patient. This seriously objectionable feature has been due both to the harsh mechanical action of the drill against the hard and resistant material of the tooth, and to the relatively high temperature that is created by the frictional action of the drill, the heat being confined and concentrated in the tooth by reason of the low degree of heat conductivity possessed by the slender steel shank of the drill. The harsh and jarring rasp and scrape of the tool and the uncomfortable heat generated are conveyed to the adjacent sensitive nerve substance where they are manifested in the form of more or less intense pain and discomfort.

The principal objects of the herein described invention are to provide a dental tool for the general purpose referred to which can be operated with a minimum degree of discomfort for the patient, and which will at the same time perform the required operations in an improved and effective manner.

I have discovered that the hard material of the teeth can be effectively cut or removed by a lapping, as distinguished from a grinding, operation, that is, by substituting for the hard-metal cutting or grinding tool a soft-metal tool arranged to act as a carrier for finely divided attritious material which engages and cuts the tooth substance. It has been found that the cutting operation performed by the finely divided attritious material is without the mechanical shock and jar attending the use of the hard metal cutting tools and that the operation can be quickly performed. In addition, advantage is taken of the possibility of using a soft metal tool or carrier to employ a metal having a high capacity for heat conduction, such as copper, so that the heat generated by the friction between the attritious material and the tooth substance is conducted away through the stem of the tool, thereby preventing an uncomfortable rise of temperature within the tooth.

I have also discovered that by forming the tool with a hollowed-out or equivalent construction with radially disposed openings, the attritious material contained in a paste-like or semi-fluid vehicle can be fed as needed into effective operating position on the surface of the tool where it can engage the dental member which is being operated upon.

Other features of the invention will be hereinafter described.

In the drawings,

Figure 1 is a view partly in side elevation and partly in longitudinal section of a device embodying a preferred form of the invention.

Figure 2 is an end view of the device shown in Figure 1.

Figure 3 is a view similar to Figure 1 of a modified form of the invention.

Figure 4 is an end view of the device shown in Figure 3.

Figure 5 is a view in perspective and on an enlarged scale of a portion of the device shown in Figure 3.

Figure 6 is a view similar to Figure 5 of another portion of the device shown in Figure 3.

Referring to the drawings in greater detail, there is illustrated in Figures 1 and 2 what may be termed a preferred form of the invention, in which a rotatable tool shank or stem 1 is provided with a hollow cylindrical head 2 formed of relatively soft metal such as copper, and provided with radially disposed openings 3. The cylindrical head 2 is attached in any suitable manner to the shank 1, or it may be formed integrally with the shank as desired. The end of the cylinder remote from the stem is preferably left open, as indicated in the drawing.

In operation, the open end of the tool head 2 is pressed into a mass of paste or semi-fluid material containing finely divided attritious material intermixed, with or without substances having antiseptic, anasthetic or other qualities suitable for the purpose, in the semi-fluid base or vehicle. Having filled the hollow receptacle-forming tool head, the operator applies the hollow head to the cavity and causes the tool head to be set into rotation whereupon centrifugal action becomes effective to cause the attritious material to flow outwardly through the openings in the hollow cylinder into operative engagement with that portion of the dental member against which the tool is held. It will be seen that an effective lapping operation is thereby attained and that the relatively soft metal forming the cylindrical head acts as a support and carrier for the attritious material which quickly eats away the engaged portion of the tooth and with a marked absence of shock and chatter. Furthermore the heat conducting qualities of the metal forming the tool act to dissipate and conduct away the heat created by the frictional action of the device, and thereby obviate the discomfort caused by the heating of the tooth in the operation of the ordinary hard-metal tool.

In Figures 3, 4, 5 and 6 is shown a modification of the invention in which the hollow head member 5 has a greater diameter than length. In addition the tool head 5 is provided with a beveled flange 6 which is also hollow and provided with openings 3, as is the hollow shell 5. A closure disk 7 fills the open end of the head 5 and is mounted on a screw stem 8 which has threaded engagement with an opening formed axially of the tool shank 1. The closure disk 7 may be provided with openings to suit the requirements of operations differing in character.

What is claimed is:—

1. A dental tool of the kind described having an operating head in the form of a hollow cylinder, and a closure for one end of the cylinder, the cylinder walls and the closure being perforated.

2. A dental tool of the kind described having an operating head in the form of a hollow cylinder with perforations in the walls thereof, said cylinder being made of relatively soft metal having good heat-conducting characteristics.

3. A dental tool comprising a cylindrical portion, the external surface of the cylindrical portion being adapted to abrasively engage the work, a cavity formed within the cylindrical portion for holding abrasive material, and openings through the walls of the cylindrical portion to permit the abrasive material to pass to the external surface of the cylindrical portion.

4. A dental tool comprising a cylindrical portion, the external surface of the cylindrical portion being adapted to abrasively engage the work, a cavity formed within the cylindrical portion for holding abrasive material, and radial openings through the walls of the cylindrical portion to permit the abrasive material to pass to the external surface of the cylindrical portion, said radial openings being distributed longitudinally and circumferentially over the periphery of the cylindrical portion.

5. A dental tool comprising a hollow cylindrical portion, the external surface of the cylindrical portion being adapted to abrasively engage the work, a closure secured in an end of the cylindrical portion, the external surface of the closure being adapted to abrasively engage the work, and openings formed through the closure and the circumferential wall of the cylindrical portion.

6. A dental tool comprising a portion of rigid material having a cylindrical external surface adapted to engage the work, the tool being formed with a cavity to hold abrasive material and with openings leading from the cavity to the cylindrical surface, the openings being adapted to conduct the abrasive material from the cavity to the cylindrical abrading surface.

In testimony whereof I affix my signature.

HERMAN E. S. CHAYES.